March 3, 1959   K. GRACE   2,875,980
TRUCK RAISING AND SUPPORTING MECHANISM
Filed June 25, 1954   3 Sheets-Sheet 1

INVENTOR.
KARL GRACE
BY
Attorney

March 3, 1959 K. GRACE 2,875,980
TRUCK RAISING AND SUPPORTING MECHANISM
Filed June 25, 1954 3 Sheets-Sheet 2
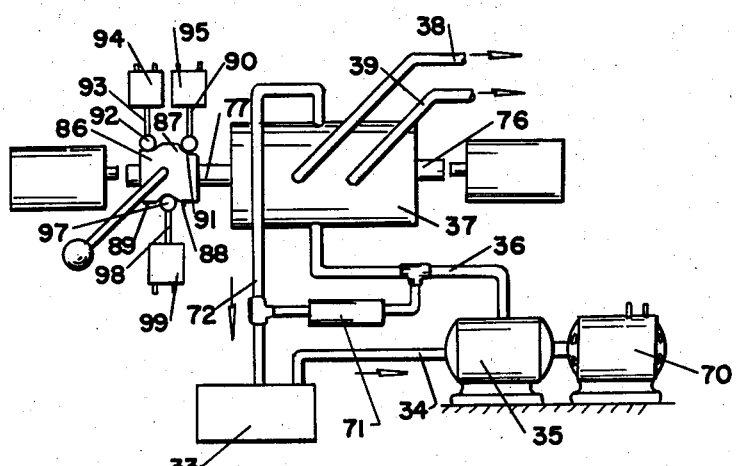
FIG. 3
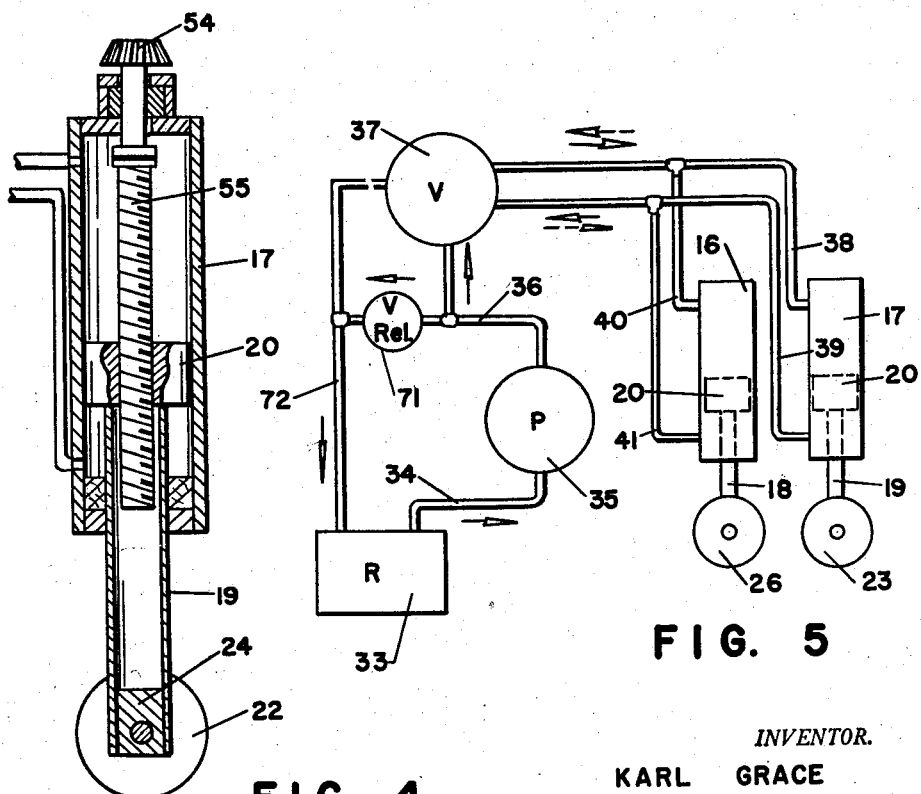
FIG. 4
FIG. 5
INVENTOR.
KARL GRACE
BY
Thos. Donnelly
Attorney March 3, 1959 K. GRACE 2,875,980
TRUCK RAISING AND SUPPORTING MECHANISM
Filed June 25, 1954 3 Sheets-Sheet 3

INVENTOR.
KARL GRACE
BY
*Thos S Donnelly*
Attorney

United States Patent Office 2,875,980
Patented Mar. 3, 1959

2,875,980
TRUCK RAISING AND SUPPORTING MECHANISM

Karl Grace, Washington, Mich.

Application June 25, 1954, Serial No. 439,294

10 Claims. (Cl. 254—86)

My invention relates to a new and useful improvement in a truck raising and supporting mechanism adapted for supporting the forward end of a trailer truck when the tractor or motive power mechanism has been removed. In this type of truck, the body of the truck is termed the trailer and the part bearing the engine is termed the tractor and is detachably connected to the forward end of the truck trailer.

Frequently it is desirable that the tractor be removed from its connection with the trailer, particularly when the loading or unloading of the trailer is being effected. When it is desired to detach the tractor from the trailer, it is of course necessary to support the forward end of the trailer.

Various mechanisms have been urged for accomplishing this, and among the most nearly satisfactory of such were those of the hydraulic type. It has been found that where purely mechanical means are used, the mechanisms are unsatisfactory due to the difficulty in elevating the forward end of the trailer truck sufficiently for permitting re-attachment of the tractor thereto.

In the hydraulically operated mechanisms an undesirable feature develops in that, when the trailer truck is left loaded over a period of time, supported at its forward end by the hydraulically operated supports, a hydraulic leak will develop, resulting in a lowering of the forward end of the trailer truck so that a ready attachment of the tractor thereto cannot be effected until a raising operation has been carried out.

It is an object of the present invention to provide a mechanism for supporting and raising the forward end of a trailer truck which will be simple in structure, economical of manufacture, durable, compact, easily and quickly operated, and highly efficient in use.

It is another object of the present invention to provide in a mechanism of this class a hydraulically operated supporting means so arranged and constructed that, as the supports move into operative position and serve to lift the forward end of the trailer truck, a hydraulic mechanism is automatically mechanically locked so that, in the event of a hydraulic leakage, no movement of the forward end of the truck may be effected.

Another object of the invention is the provision in a mechanism of this class of hydraulic supporting and lifting means whereby a screw is used to cooperate with the piston and, if necessary, support the entire load.

Another object of the invention is a construction whereby all of the controls will be mounted at a point accessible to the driver of the tractor so that the mechanism can be easily and quickly operated.

Another object of the invention is the provision of a mechanism having supports at opposite sides on a trailer truck at the forward end thereof, so arranged and constructed that one of these supports may extend outwardly beyond the other so as to compensate for an elevation or depression on the ground or the supporting body.

Other objects will appear hereinafter.

It is recognized that various changes and modifications may be made in the detail of structure illustrated without departing from the invention, but it is intended that the present disclosure shall be considered to be but the preferred embodiment.

Forming a part of this application are drawings in which,

Fig. 3 is a schematic view of a part of the hydraulic circuit,

Fig. 4 is a longitudinal central sectional view through one of the supports,

Fig. 5 is a schematic view of another part of the hydraulic controls,

Figure 2:
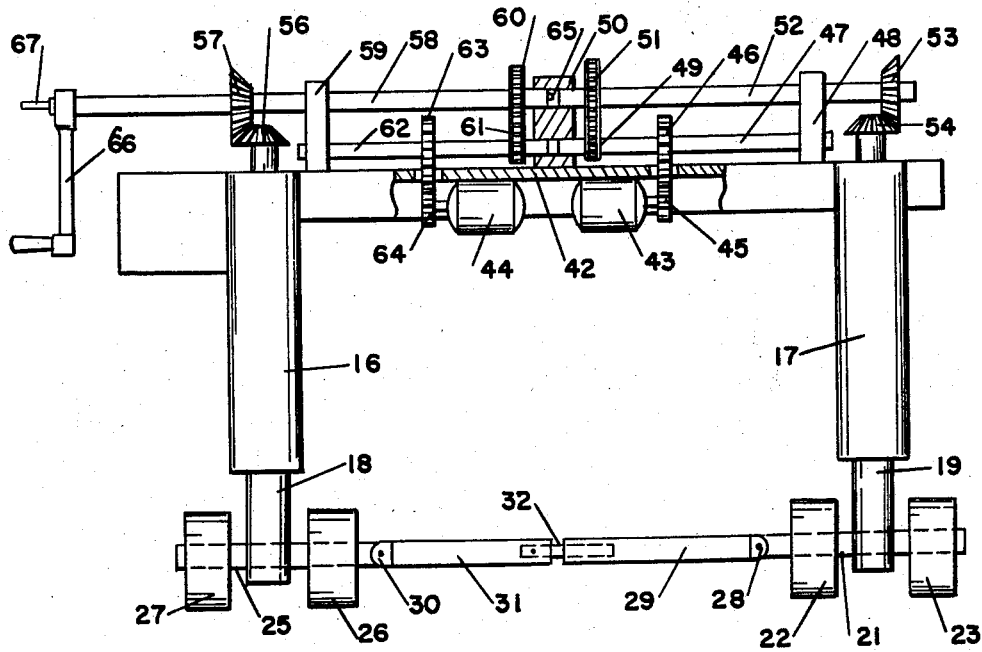
Fig. 2 is a front elevational view of Fig. 1.
Figure 1:
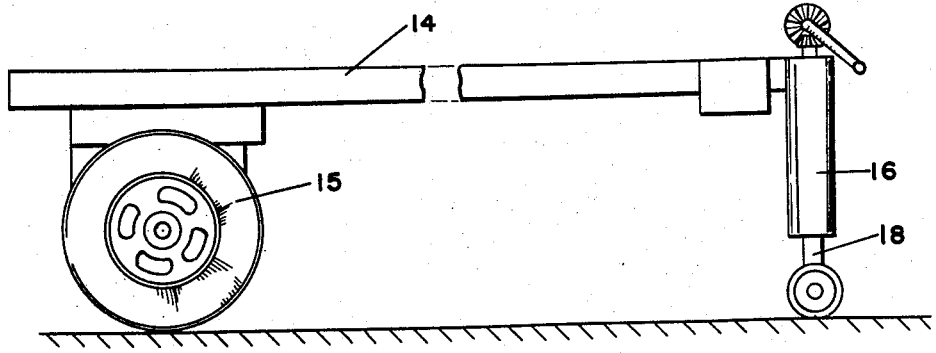
Fig. 1 is a side elevational view of the invention attached to a trailer truck.

In the drawings I have illustrated a trailer 14 supported with traction wheels 15 at its rear end. Secured to and projecting downwardly from the forward end of this trailer 14 are cylinders 16 and 17. A piston rod 18 extends outwardly from the cylinder 16 and a similar piston rod 19 extends outwardly from the cylinder 17. The construction of the interior of each of these cylinders is the same so that a description of one will suffice for both.

As clearly shown in Fig. 4, there is slidable in the cylinder 17 a piston 20, secured to which is a piston rod 19. The piston rod 19 is provided with a plug 24 which is secured thereto and through which extends an axle 21, on which are rotatably mounted the rollers or wheels 22 and 23.

As shown in Fig. 2, the piston rod 18 is similarly connected to an axle 25, on which are mounted the rollers or wheels 26 and 27. As shown in Fig. 2, the axle 21 is pivoted at 28 to the extension 29, and the axle 25 is pivoted at 30 to the extension 31. Secured to and projecting from the extension 31 is a rod 32 which telescopes in a socket formed in the extension 29. By this form of mounting, the wheels 22 and 23 may be lowered a greater or less distance than the wheels 25 and 26.

As shown in Fig. 5, I provide a reservoir 33 in which liquid, preferably oil, is stored, and which also serves as a sump for the returned liquid from the cylinders. A pipe 34 connects the reservoir 33 with a pump 35, which in turn is connected through an outlet pipe 36 with a valve housing 37.

Leading into the cylinder 17 at one end is a pipe 38, and a pipe 39 communicates with the other end of the cylinder. A pipe 40 communicates with one end of the cylinder 16, and a pipe 41 communicates with the opposite end of the same cylinder. When the valve mechanism is suitably operated, liquid may be delivered under pressure to either end of the cylinders 16 and 17, either selectively or simultaneously.

As shown in Fig. 2, there is mounted on the bed 42 of the trailer a pair of electric motors 43 and 44. The motor 43 drives the gear 45 which meshes with the gear 46, this gear 46 being fixedly mounted on the shaft 47 journalled in the blocks 48 and 50. Fixedly mounted on the shaft 47 is a gear 49 meshing with a gear 51 fixedly mounted on the shaft 52. A bevel gear 53 fixedly mounted on the shaft 52 meshes with a bevel gear 54 fixedly mounted on the screw 55 which is threaded through the piston 20 as shown in Fig. 4. The screw 55 is in substantially fixed axial relation to the cylinder 17, because the fixedly mounted gear 54 prevents the screw 55 from moving inwardly of said cylinder, and, a thrust bearing (Fig. 4, not numbered) mounted on the upper portion of said screw, just inside the upper end cover of said cylinder, prevents said screw from moving outwardly. A suitable conventional thrust washer may be inserted, if desired, between the gear 54 and the top of the packing box (Fig. 4, not numbered) on the upper end of cylinder 17, to prevent the gear 54 from binding on the packing box.

The cylinder 16 is provided with a bevel gear 56 used to drive a screw such as the screw 55 shown in Fig. 4. This bevel gear 56 meshes with the bevel gear 57 fixedly mounted on the tubular shaft 58 which is journalled in the blocks 50 and 59. Mounted on the shaft 58 is a gear 60 driven by a gear 61 which is fixedly mounted on the shaft 62. Fixedly mounted on the shaft 62 is a gear 63 driven by the gear 64 which is operated by the electric motor 44.

The construction is such that when the control mechanisms are operated, the pump 35 will be operated to deliver liquid to one end or the other of the cylinders 16 and 17. At the same time, the motors 43 and 44 will be energized so that the screw in each of the cylinders is rotated.

An examination of Fig. 4 would clearly indicate that if liquid may be delivered to the cylinder 17 at one end or the other of the piston 20, the piston could not move because of the connection with the screw 55. However, in view of the hydraulic pressure on the piston, very little power would be required to rotate the screw. After the piston has been moved to the end position in its cylinder, should the hydraulic pressure fail for any reason, the piston still will not move because of the connection with the screw. This safeguards against a break in the hydraulic circuit and also guards against movement resulting from leakage in the hydraulic circuit.

Figure 8:
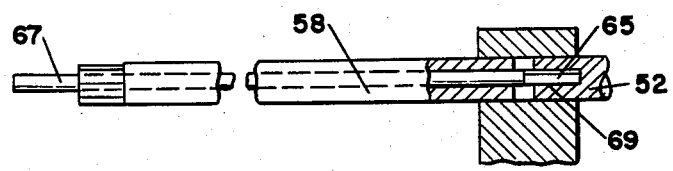
Fig. 8 is a fragmentary sectional view taken through a crank mechanism used in the invention.

As shown in Fig. 8, there is extended through the shaft 58 a rod 67 having a flat sided end 65 engageable in the socket 69 formed in the shaft 52. This construction is present so that, if necessary, the shaft 52 may be rotated through the operation of the crank 66. Thus it becomes possible to elevate or lower the front end of the trailer truck without the use of any power other than hand power, the rod 67 being slidable in the member 58.

As shown in the schematic view illustrated in Fig. 3, the pump 35 is driven by an electric motor 70, the pump serving to deliver liquid through the pipe 36 into the valve housing 37. A relief valve 71 serves to connect the line 36 with a return line 72 which flows through the reservoir or sump 33.

In this housing 37 is a valve embodying a slidable spool 73 having the enlargements 74 and 75 and provided with the ends 76 and 77 which extend beyond the opposite sides of the housing 37. By sliding this spool from one end to the other, the direction of flow through the lines 38 and 39 may be determined so that the liquid may be delivered to one end or the other of the cylinders 16 and 17.

Figure 6:
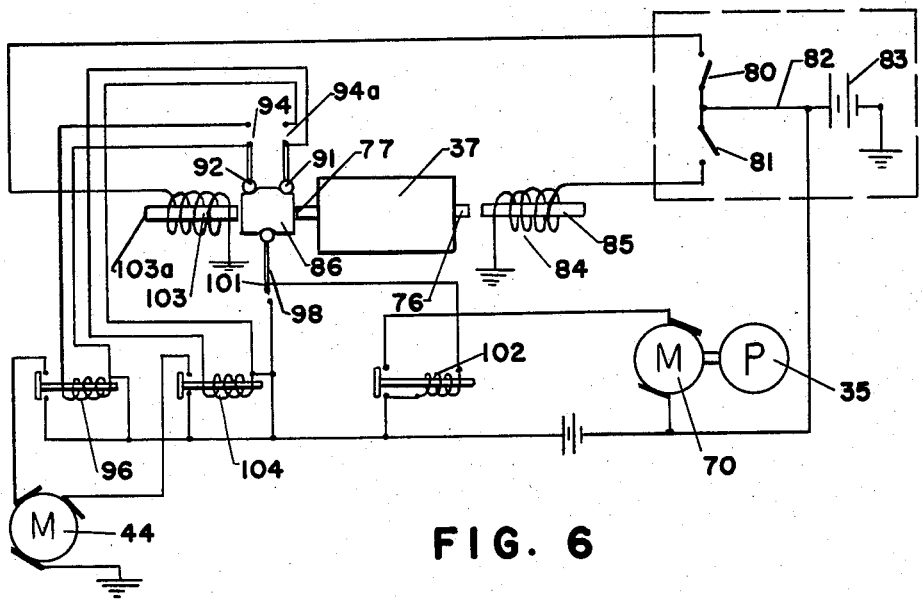
Fig. 6 illustrates the wiring used in the invention.

In the wiring diagram in Fig. 6 I have shown a line 82 connecting one side of the battery 83 to a pair of manually operated switches 80 and 81. These switches would, of course, be located in the cab of the tractor so as to be easily accessible to the driver.

Figure 7:
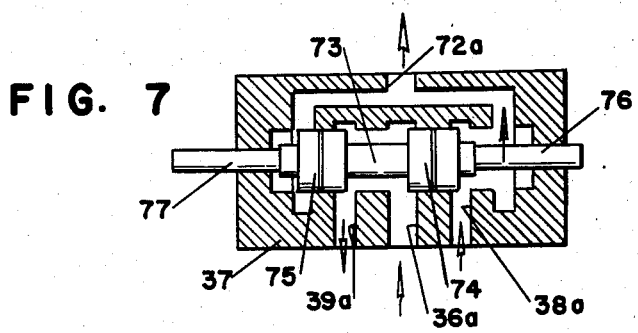
Fig. 7 is a longitudinal cross-sectional view of a valve used in the invention.

In Fig. 7 I have shown the valve moved to a position whereby the fluid is flowing into the lower part of the cylinder through the port 39a into the pipes 39 and 41, the port 36a being the intake port and the liquid travelling in the direction indicated by the arrows in Fig. 7. The port 38a is the outlet delivery port or return port to the upper ends of the cylinders connecting to the pipes 38 and 40, and the exhaust or return pipe 72 is connected to the port 72a.

It is believed obvious that, upon moving of the valve to the right of Fig. 7, the liquid may be delivered to the upper ends of the cylinders instead of to the lower ends.

Referring to the wiring diagram of Fig. 6, it will be seen that a closing of the switch 81 will serve to energize the solenoid coil 84, and the plunger thereof would move to the left of Fig. 6, moving the valve into the position shown in Fig. 7.

As shown in Fig. 3, there is fixedly mounted on the valve sleeve extension 77 a cam block 86 having the lobes 87, 88 and 89. An arm 90 carries the roller 91 which is adapted to ride on the upper face of the cam block 86. When this cam block is moved to the right of Fig. 3, this roller 91 would ride on the lobe 87. A similar arm 93 carries a roller 92 which rides on the top of the cam block 86 and is connected to the switch closing mechanism 94. The arm 90 is also connected to the switch closing mechanism 95.

Upon the energizing of the solenoid 84, the valve sleeve would be pushed to the position shown in Fig. 7 so that the roller 92 would ride on to the lobe on the upper surface of the cam block 86 so as to close the switch at 94 and effect an energizing of the relay 96, thus closing the circuits to the motors 43 and 44. These motors are constructed to rotate in either direction, and upon closing the switch 81, these motors will be energized to rotate in the reverse direction as the movement of the pistons 20 will be upwardly.

At the same time, the switch closing mechanism 99 carried by the arm 98 will close the switch at 101 so as to energize the relay 102, thus closing the circuit to the pump motor 70. Upon closing the switch 80 while the switch 81 is open, the solenoid 103 will be energized, and the core 103a thereof will move to the right of Fig. 6 so that the port 39 will be open to the exhaust port 72a and closed to the intake port 36a, while the port 38a will be closed to the exhaust port 72a and open to the intake port 36a.

At the same time the roller 91 will ride on to the lobe on the upper surface of the cam block 86 so that the switch 94a will be closed, thus energizing the relay 104 and closing the circuit to the motors 43 and 44, which would effect movement of the pistons 20 through a rotation of the screws 55. At the same time, the switch 101 would be closed to energize the relay 102 and close the circuit to the pump motor 70.

It is preferred that the switches 80 and 81 be of a spring pressed type so that they remain closed only while the operator is pressing the switches to closed position.

It is believed obvious that when the valve spool in the valve housing 37 is moved to one position or the other, it remains in that position until the solenoids 84 and 103 are again energized. The hydraulic lock, therefore, would extend from the pump 35 to the respective cylinders.

With this construction it is not necessary that an absolutely leakproof connection between the cylinders and the pistons 20 be effected because, when the pistons have been moved either upwardly or downwardly, it is not necessary to depend on the hydraulic lock to retain the piston in position. This will be assured through the cooperation of the screws 55 and the pistons 20.

Should for any reason the electrical mechanism or the hydraulic mechanism refuse to function, the operator of the vehicle could still raise or lower the front end of the trailer truck manually. This is accomplished by sliding the rod 67 until the flat faced portion 65 engages in the socket 69. The member 58 may then be rotated by means of the crank 66, and in such rotation the rod 67 will rotate simultaneously with the member 58.

This type of construction has proven most highly efficient in use and appears to eliminate the objectionable features in other types of elevating mechanisms, some of which have been herein referred to.

What I claim is:

1. A mechanism of the class described adapted for mounting on the forward end of a trailer truck having a bed comprising: a cylinder mounted on and projecting downwardly from the forward end of said bed; a piston slidably mounted in said cylinder; a piston rod connected to said piston and projecting outwardly beyond the lower end of said piston; a contact member carried on the lower end of said piston rod for engaging a supporting surface; a screw projected into said cylinder through the upper end thereof and rotatable relatively to and in fixed relation to the cylinder and threaded through the piston; a hydraulic circuit for delivering fluid under pressure into either end of said cylinder; means for rotating said screw in either direction; and control means for controlling the flow of fluid into said cylinder and determining the end of said cylinder into which said fluid may be delivered and simultaneously actuating said rotating means and determining the direction of rotation of same dependent upon the end of the cylinder into which the fluid may be delivered.

2. A mechanism of the class described adapted for mounting on the forward end of a trailer truck having a bed comprising: a pair of cylinders mounted on and projecting downwardly from the forward end of said bed; a piston slidably mounted in each of said cylinders; a piston rod connected to each of said pistons and projecting downwardly beyond the lower end of said cylinders; a contact member on the end of each of said rods for engaging a supporting surface; a screw projected inwardly of each of said cylinders from the upper end thereof and in fixed axial relation thereto and rotatable relatively thereto; a motor for rotating each of said screws; a hydraulic circuit for delivering liquid into each of said cylinders at opposite ends thereof selectively; a pump for pumping liquid through said hydraulic system; an electric motor for operating said pump; and control means operable for closing the circuits to said motors and simultaneously determining the end of the cylinder to which the liquid may be delivered.

3. A mechanism of the class described adapted for mounting on the forward end of a trailer truck having a bed comprising: a pair of cylinders mounted on and projecting downwardly from the forward end of said bed; a piston slidably mounted in each of said cylinders; a piston rod connected to each of said pistons and projecting downwardly beyond the lower end of said cylinders; a contact member on the end of each of said rods for engaging a supporting surface; a screw projected inwardly of each of said cylinders from the upper end thereof and in fixed axial relation thereto and rotatable relatively thereto; a motor for rotating each of said screws; a hydraulic circuit for delivering liquid into each of said cylinders at opposite ends thereof selectively; a pump for pumping liquid through said hydraulic system; an electric motor for operating said pump; control means operable for closing the circuits to said motors and simultaneously determining the end of the cylinder to which the liquid may be delivered; and means for movably connecting said contact members together.

4. A mechanism of the class described adapted for mounting on the forward end of a trailer truck having a bed comprising: a pair of cylinders mounted on and projecting downwardly from the forward end of said bed; a piston slidably mounted in each of said cylinders; a piston rod connected to each of said pistons and projecting downwardly beyond the lower end of said cylinders; a contact member on the end of each of said rods for engaging a supporting surface; a screw projected inwardly of each of said cylinders from the upper end thereof and in fixed axial relation thereto and rotatable relatively thereto; a motor for rotating each of said screws; a hydraulic circuit for delivering liquid into each of said cylinders at opposite ends thereof selectively; a pump for pumping liquid through said hydraulic system; an electric motor for operating said pump; control means operable for closing the circuits to said motors and simultaneously determining the end of the cylinder to which the liquid may be delivered; and manually operable means for rotating said screws independently of the operation of said means.

5. A mechanism of the class described adapted for mounting on the forward end of a trailer truck having a bed comprising: a pair of spaced apart cylinders secured to and projecting downwardly from the front of said bed; a piston slidably mounted in each of said cylinders; a piston rod connected to each of said pistons and extending outwardly beyond the end of said cylinders; a contact member carried by the exterior end of said piston rod for engaging a supporting surface; a screw projected through the upper end of each of said cylinders and in fixed axial relation thereto and rotatable relatively thereto and threaded through the pistons; a hydraulic circuit for delivering liquid into each of said cylinders at opposite ends thereof; a pump for pumping said liquid under pressure; an electric motor for operating said pump; means for rotating said screws; an electric motor for actuating said screw rotating means; a control valve for controlling the flow of liquid to said cylinders and determining the end of the cylinder to which liquid is delivered, said control valve being movable to one position or another; and a solenoid for moving said control valve to one position.

6. A mechanism of the class described adapted for mounting on the forward end of a trailer truck having a bed comprising: a pair of spaced apart cylinders secured to and projecting downwardly from the front of said bed; a piston slidably mounted in each of said cylinders; a piston rod connected to each of said pistons and extending outwardly beyond the end of said cylinders; a contact member carried by the exterior end of said piston rod for engaging a supporting surface; a screw projected through the upper end of each of said cylinders and in fixed axial relation thereto and rotatable relatively thereto and threaded through the pistons; a hydraulic circuit for delivering liquid into each of said cylinders at opposite ends thereof; a pump for pumping said liquid under pressure; an electric motor for operating said pump; means for rotating said screws; an electric motor for actuating said screw rotating means; a control valve for controlling the flow of liquid to said cylinders and determining the end of the cylinder to which liquid is delivered, said control valve being movable to one position or another; a solenoid for moving said control valve to one position; and a second solenoid for moving said valve to another position.

7. A mechanism of the class described adapted for mounting on the forward end of a trailer truck having a bed comprising: a pair of spaced apart cylinders secured to and projecting downwardly from the front of said bed; a piston slidably mounted in each of said cylinders; a piston rod connected to each of said pistons and extending outwardly beyond the end of said cylinders; a contact member carried by the exterior end of said piston rod for engaging a supporting surface; a screw projected through the upper end of each of said cylinders and in fixed axial relation thereto and rotatable relatively thereto and threaded through the pistons; a hydraulic circuit for delivering liquid into each of said cylinders at opposite ends thereof; a pump for pumping said liquid under pressure; an electric motor for operating said pump; means for rotating said screws; an electric motor for actuating said screw rotating means; a control valve for controlling the flow of liquid to said cylinders and determining the ends of the cylinders to which liquid is delivered, said control valve being movable to one position or another; a solenoid for moving said control valve to one position; a second solenoid for moving said valve to another position; and a circuit making means for closing the circuit to said motors upon movement of said valve to one position and effecting a rotation of the motors actuating said rotating means in one direction, and upon movement of said valve to another position, for closing the circuits to said motors, effecting a rotation of said rotation actuating motors in the opposite direction.

8. A mechanism of the class described adapted for mounting on the forward end of a trailer truck having a bed comprising: a pair of spaced apart cylinders secured to and projecting downwardly from the front of said bed; a piston slidably mounted in each of said cylinders; a piston rod connected to each of said pistons and extending outwardly beyond the end of said cylinder; a contact member carried by the exterior end of said piston rod for engaging a supporting surface; a screw projected through the upper end of each of said cylinders and in fixed axial relation thereto and rotatable relatively thereto and threaded through the pistons; a hydraulic circuit for delivering liquid into each of said cylinders at opposite ends thereof; a pump for pumping said liquid under pressure; an electric motor for operating said pump; means for rotating said screws; an electric motor for actuating said screw rotating means; a control valve for controlling the flow of liquid to said cylinders and determining the ends of the cylinders to which liquid is delivered, said control valve being movable to one position or another; a solenoid for moving said control valve to one position; a second solenoid for moving said valve to another position; a circuit making means for closing the circuits to said motors, upon movement of said valve to one position, and effecting a rotation of the motors actuating said rotating means in one direction, and upon movement of said valve to another position, for closing the circuits to said motors, effecting a rotation of said rotation actuating motors in the opposite direction; and manually operable means for rotating said rotating means irrespective of the operation of said electric motors.

9. In a hydraulic system, a cylinder; a piston slidably mounted in said cylinder; a hollow piston rod connected to one side of said piston and projecting outwardly therefrom through one end of said cylinder; a longitudinally disposed screw threaded through the piston and into said hollow piston rod; said screw being rotatable relatively to the cylinder but in a fixed relationship therewith; a hydraulic circuit for delivering fluid under pressure into either end of said cylinder; means for rotating said screw in either direction; and, control means for controlling the flow of fluid into said cylinder and determining the end of said cylinder into which said fluid may be delivered and simultaneously actuating said rotating means and determining the direction of rotation of same dependent upon the end of the cylinder into which the fluid may be delivered.

10. In a hydraulic system, a cylinder; a piston slidably mounted in said cylinder; a hollow piston rod connected to one side of said piston and projecting outwardly therefrom through one end of said cylinder; a longitudinally disposed screw mounted in said cylinder in the other end thereof, and rotatable relatively to and in fixed relation to the cylinder and threaded through the piston into said piston rod; a motor for rotating said screw being operatively connected therewith; a hydraulic circuit for delivering liquid into said cylinder at the opposite ends thereof selectively; a pump for pumping liquid through said hydraulic system; an electric motor for operating said pump; and, control means operable for actuating said motors and for simultaneously determining the end of the cylinder to which the liquid may be delivered.

References Cited in the file of this patent
UNITED STATES PATENTS

| | | |
|---|---|---|
| 1,437,626 | Wilson | Dec. 5, 1922 |
| 1,877,364 | Schoenberg | Sept. 13, 1932 |
| 2,048,264 | Harris | July 21, 1936 |
| 2,169,174 | Ziebolz et al. | Aug. 8, 1939 |
| 2,446,517 | Black | Aug. 10, 1948 |
| 2,476,376 | Laraque | July 19, 1949 |
| 2,508,587 | Turchan et al. | May 23, 1950 |
| 2,523,962 | Mahaffey et al. | Sept. 26, 1950 |
| 2,660,028 | Geyer | Nov. 24, 1953 |